(Model.)

2 Sheets—Sheet 1.

A. FRALEY.
BEE HIVE.

No. 290,022.

Patented Dec. 11, 1883.

WITNESSES:
Chas. Nide
C. Sedgwick

INVENTOR:
A. Fraley
BY Munn & Co.
ATTORNEYS.

(Model.)
2 Sheets—Sheet 2.
A. FRALEY.
BEE HIVE.
No. 290,022.   Patented Dec. 11, 1883.
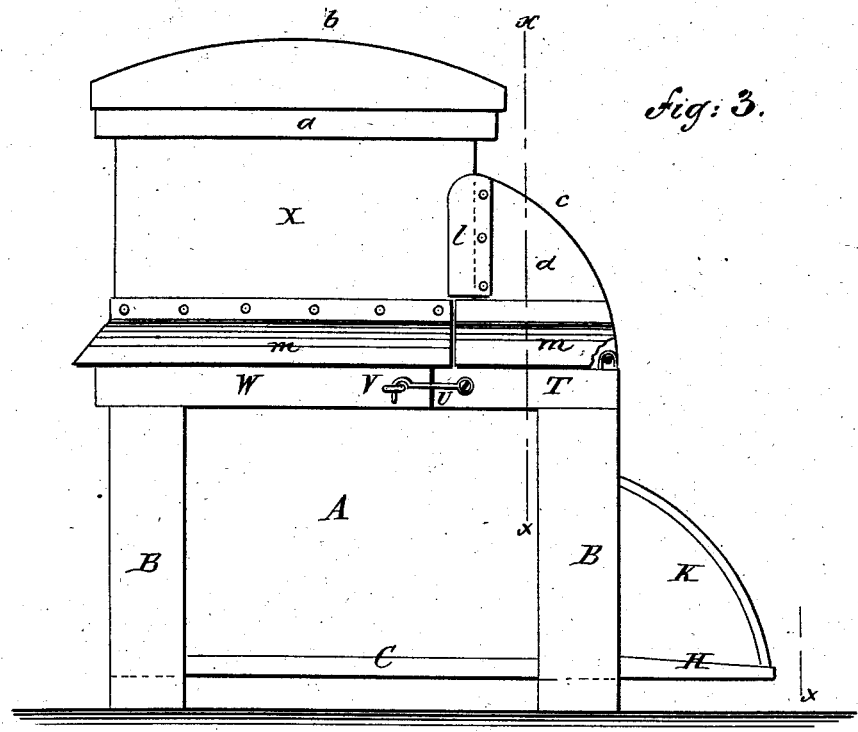
Fig: 3.
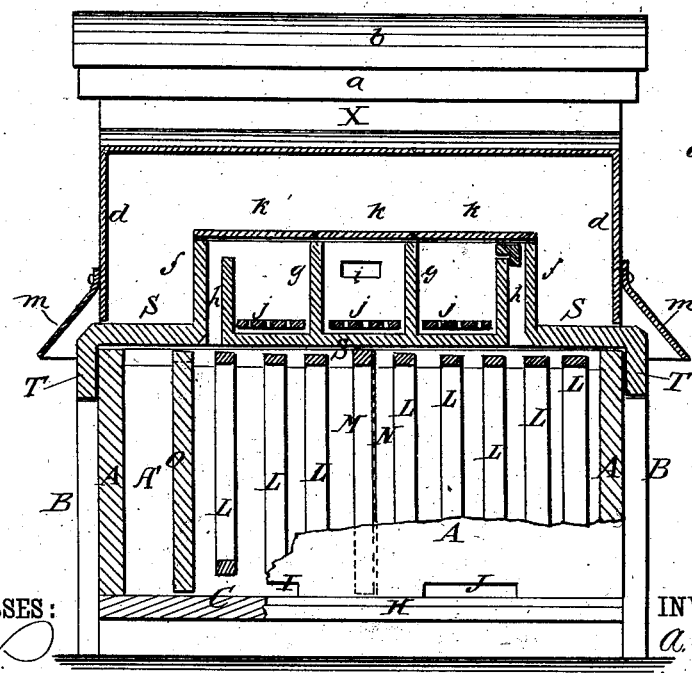
Fig: 4.
WITNESSES:
Chas. Nida
C. Sedgwick
INVENTOR:
A. Fraley
BY Munn & Co.
ATTORNEYS.

UNITED STATES PATENT OFFICE.

ALEXANDER FRALEY, OF GRAYSON, KENTUCKY, ASSIGNOR TO HIMSELF AND WILLIAM D. MALONE, OF SAME PLACE.

BEE-HIVE.

SPECIFICATION forming part of Letters Patent No. 290,022, dated December 11, 1883.

Application filed March 29, 1883. (Model.)

*To all whom it may concern:*

Be it known that I, ALEXANDER FRALEY, of Grayson, in the county of Carter and State of Kentucky, have invented a new and Improved Bee-Hive, of which the following is a full, clear, and exact description.

Reference is to be had to the accompanying drawings, forming a part of this specification, in which similar letters of reference indicate corresponding parts in all the figures.

Figure 1:
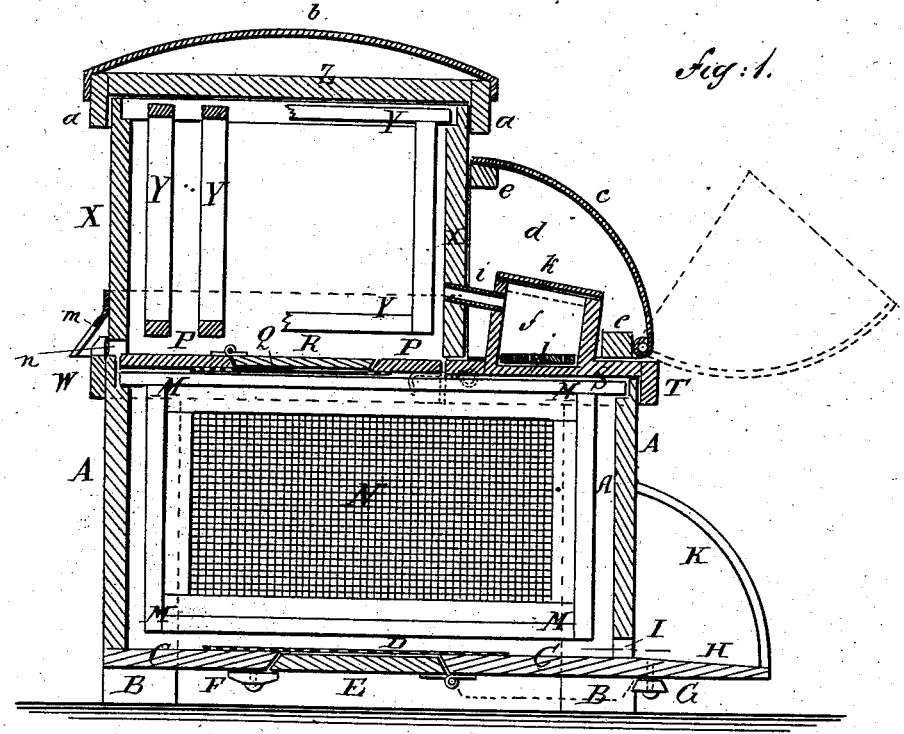
Figure 2:
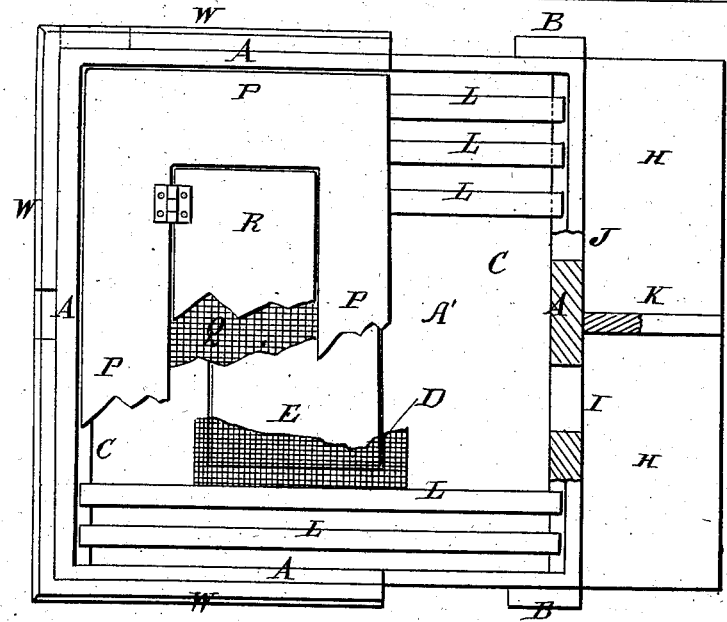

Figure 1, Sheet 1, is a sectional side elevation of my improved bee-hive. Fig. 2, Sheet 1, is a plan view, partly in section, of the lower part of the same. Fig. 3, Sheet 2, is a side elevation of the hive. Fig. 4, Sheet 2, is a front elevation of the same, partly in section through the line *x x x*, Fig. 3.

The object of this invention is to improve the construction of the bee-hives for which Letters Patent No. 267,177 were issued November 7, 1882, in such a manner as to make them more convenient in use and better adapted to bee-culture; and to this end it consists in the peculiar construction and arrangement of parts, as hereinafter fully described, and pointed out in the claims.

A is the lower part of the hive, to the corners of which are attached uprights B. The uprights B project below the bottom C of the hive, to serve as legs to support the hive above the table or bench upon which it is placed, and allow the air to have a free circulation beneath the said hive.

In the bottom C is formed a large opening, which is covered upon the inner side with wire-gauze D, to prevent moths and other insects from entering the hive through the said opening. The opening in the bottom C is closed by a door, E, which is hinged at one edge to the said bottom, so that it can be opened by swinging it downward. The door E, when shut, is fastened by a button, F, pivoted to the bottom C, and is fastened in place, when opened, by a similar button, G, also pivoted to the said bottom, as shown in Fig. 1, so that air can be admitted to the hive freely when desired. At the front of the hive the bottom C projects to form a platform, H, for the bees to alight upon and take flight from.

At the upper side of the platform H, upon the opposite sides of and equally distant from its center, are formed two entrances, I J, leading into the lower section or brood-chamber, A'.

To the platform H and the front of the hive is attached a triangular board, K, the outer edge of which may be rounded, as shown in Figs. 1 and 3, to separate the entrances I J, so that the lower section or brood-chamber, A', can be used for two separate colonies.

L are the comb-frames of the lower section or brood-chamber, A', the ends of the top bars of which project and rest in rabbets in the upper edges of the front and back of the hive.

When the lower section or brood-chamber, A', is to be used for two colonies, the said chamber is divided into two compartments by a division-frame, M, covered with wire-gauze N, so that should one of the colonies be weaker than the other it may receive warmth from the stronger colony, and may thus be kept alive through the winter.

O is a division-board, which is designed to be used when the colony or colonies in the lower section or brood-chamber, A', do not fill said chamber, and it is desirable to confine them within such a space as they can fill, so as to keep them warm during cold weather.

P is the honey-board, which rests upon and covers the rear and middle parts of the comb-frames L.

In the middle part of the honey-board P is formed an opening, which is covered upon the lower side by wire-gauze Q, and is closed by a door, R, hinged at one edge to the said board P, so that the said door R can be opened upward when it is desired to ventilate the honey-box, upper section, or as, for instance, when bees are being shipped in the hive. The forward parts of the comb-frames L are covered by the board S, which forms the bottom of the feed-chamber, and is kept in place upon the top of the chamber A by a downwardly-projecting flange, T, attached to its end and outer side edges, and which overlaps the sides of the said chamber A. The board S is further secured in place by hooks U, hinged to the flange T near its ends, and which hook into eyes or staples V, attached to the end parts of the flange W onto the upper parts of the sides and back of the chamber A', and which projects above the top of the said chamber, to keep the honey-box or upper section, X', of the hive in place. The box X is made open at top and bottom, and its lower edge rests upon the upper edge of the walls of the chamber A, and upon the inner part of the board S, as shown in Fig. 1. The inner sides of the upper edges of the sides and ends of the box X are rabbeted, to receive the projecting ends of the top bars of the comb-frames Y, so that long comb-frames can be used, as indicated at the left-hand part of Fig. 1, or short comb-frames, as indicated at the right-hand part of the said figure. Upon the top of the box X rests the cover Z, which has flanges $a$ attached to its edges, to keep it in place. The end flanges, $a$, project above the cover Z, and have their upper edges arched, to receive and support the arched sheet-metal cover $b$, the edges of which are bent down upon and are secured to the flanges $a$, so as to protect the top Z of the hive from the weather.

To the outer edge of the board S is hinged the lower edge of the curved sheet-metal plate $c$, the end edges of which are attached to the curved edges of the end boards, $d$, and its side edges are kept in place by the bars $e$, attached to them and to the end boards, $d$, so that the feed-chamber lid can be readily turned back to give access to the feed-trough when required.

To the bottom board, S, of the feed-chamber is attached the feed-trough $f$, which is divided into three compartments by two vertical partitions, $g$. The end compartments of the feed-trough $f$ are connected with the chamber A by passages $h$, leading down through the board S, upon the opposite sides of the division-frame M N, as shown in Fig. 4. The middle compartment of the feed-trough $f$ is connected with the box X by a tube, $i$, to form a bee-passage from the said box to the said compartment. With this construction three colonies of bees can be wintered in the same hive and fed separately from the trough $f$.

In each compartment of the feed-trough $f$ is placed a perforated board, $j$, when liquid feed is used, to float upon the said feed, to prevent bees from getting into the feed and being drowned. Each compartment of the trough $f$ is provided with a cover, $k$, to prevent the bees from passing from a compartment in the feed-trough into the feed-chamber.

To the inner edges of the ends of the feed-chamber lid $c$ $d$ are attached sheet-metal flanges $l$, to overlap the ends of the honey-box X, and prevent wind and rain from entering through the joint between the said lid and box.

To the lower parts of the rear side and ends of the box X and the ends of the feed-chamber lid $c$ $d$ are attached sheet-metal flanges $m$, to overlap the flanges W T, and prevent wind and rain from entering the hive through the joint between the said box and feed-chamber and the said flanges.

In the lower part of the back of the box X is formed an opening, $n$, to form a passage for the bees in entering and leaving the said box.

Having thus described my invention, I claim as new and desire to secure by Letters Patent—

1. In a bee-hive, the combination, with the brood-chamber A' and the bottom board, S, of the feed-chamber, of the box X, provided with the flanges $m$, and the hinged lid $c$ $d$, provided with the flanges $l$ $m$, substantially as herein shown and described.

2. In a bee-hive, the combination, with the brood-chamber A', having an opening in its bottom covered by wire-gauze D, and the downwardly-opening door E, of the box X and the honey-board P, provided with an opening covered by wire-gauze Q, and the door R, opening upwardly, substantially as herein shown and described.

3. In a bee-hive, the feed-trough $f$, divided into three compartments, and having the end compartments connected with the chamber A' by passages $h$, and the central compartment connected with the box X by a passage, $i$, substantially as herein shown and described, whereby three colonies of bees can be fed separately, as set forth.

ALEXANDER FRALEY.

Witnesses:
WM. D. MALONE,
JAMES P. PINKERTON.